United States Patent
Takamura et al.

(10) Patent No.: US 7,479,242 B2
(45) Date of Patent: Jan. 20, 2009

(54) COMPLEX MIXED CONDUCTOR CONTAINING PR-DOPED CERIUM OXIDE AND SPINEL-TYPE FERRITE AND ITS PREPARATION METHOD

(75) Inventors: Hitoshi Takamura, Miyagi (JP); Masuo Okada, Miyagi (JP)

(73) Assignee: Japan Science and Technology Agency, Kawaguchi-shi (JP)

( * ) Notice: Subject to any disclaimer, the term of this patent is extended or adjusted under 35 U.S.C. 154(b) by 46 days.

(21) Appl. No.: 11/783,946

(22) Filed: Apr. 13, 2007

(65) Prior Publication Data

US 2007/0252114 A1 Nov. 1, 2007

Related U.S. Application Data

(62) Division of application No. 10/510,343, filed as application No. PCT/JP03/04435 on Apr. 8, 2003, now Pat. No. 7,223,358.

(30) Foreign Application Priority Data

Apr. 10, 2002 (JP) .............. 2002-108504

(51) Int. Cl.
*H01B 1/08* (2006.01)
(52) U.S. Cl. ............................ 252/521.1; 423/593.1
(58) Field of Classification Search ............. 252/521.1, 252/521.2; 423/593.1
See application file for complete search history.

(56) References Cited

U.S. PATENT DOCUMENTS 5,723,074 A * 3/1998 Balachandran et al. ... 252/519.1
6,641,626 B2 * 11/2003 Van Calcar et al. ........ 48/198.2
2003/0027033 A1 2/2003 Seabaugh et al.

FOREIGN PATENT DOCUMENTS

| EP | 1 026 123 | 8/2000 |
|---|---|---|
| JP | 2000-260436 | 9/2000 |
| JP | 2002-333424 | 11/2002 |
| JP | 2005-053763 | 3/2005 |
| JP | 2005-281086 | 10/2005 |

OTHER PUBLICATIONS

Notification of Transmittal of Copies of Translation of the International Preliminary Examination Report dated Oct. 14, 2004 issued in corresponding International Application No. PCT/JP03/04435.

* cited by examiner

*Primary Examiner*—Mark Kopec
(74) *Attorney, Agent, or Firm*—Westerman, Hattori, Daniels & Adrian, LLP.

(57) ABSTRACT

It is a composite-type mixed oxygen ion and electronic conductor, in which an oxygen ion conductive phase consists of gadolinium-doped cerium oxide (GDC), an electronic conductive phase consists of spinel-type ferrite (CFO), the particle diameters of both phases are 1 μm or less, respectively, both phases are uniformly mixed mutually, and both phases form respective conductive networks. Both phases have low solid solubility mutually, chemical reactions are not easily caused between both phases, and even if chemical reactions are caused between both phases, different phase to disturb mixed conductivity is not formed. And it has high oxygen permeability, and does not easily cause aged deterioration.

9 Claims, 9 Drawing Sheets

Grain Boundary Phase

GDC-x vol% Oxygen Permeability of CFO Composite

| Composition | Temperature (°C) | Thickness (mm) | Gas | $j_{O_2}$ ($\mu$mol·cm$^{-2}$·s$^{-1}$) | Ref |
|---|---|---|---|---|---|
| 31CFO | 1000 | 1.38 | He | 0.107 | This work |
| 24CFO-Ni | 1000 | 1.05 | He | 0.204 | This work |
| 24CFO-Ru | 1000 | 1.04 | He | 0.208 | This work |
| 24CFO-Ru | 1000 | 0.86 | Ar-H$_2$ | 1.260 | This work |
| 25GCC | 1000 | 1.50 | He | 0.083 | (1) |
| 25LSM | 950 | 1.00 | He | 0.067 | (2) |

(1) U. Niggeet et. al. Solid State Ionics 146 (2002) 163.
(2) V.V. Kharton et. al. J. Eur. Ceram. Soc. 21 (2001) 1763.

COMPLEX MIXED CONDUCTOR CONTAINING PR-DOPED CERIUM OXIDE AND SPINEL-TYPE FERRITE AND ITS PREPARATION METHOD

This application is a DIV of Ser. No. 10/510,343 (filed Oct. 5, 2004, now U.S. Pat. No. 7,223,358), which application is a 371 of PCT/JP03/04435 (filed Apr. 8, 2003).

TECHNICAL FIELD

The present invention relates, to a composite-type mixed oxygen ion and electronic conductor having mixed electrical conductivity arising from oxygen ions and electrons and having oxygen permeability, and to a method of manufacturing the same. Further in more details, the present invention relates to a composite-type mixed oxygen ion and electronic conductor preferably used as the electrode material for fuel cells and oxygen-permeation membranes for oxygen separation from air, or partial oxidation of methane, and the method of manufacturing the same.

BACKGROUND ART

A composite-type mixed oxygen ion and electronic conductor having mixed electrical conductivity arising from oxygen ions and electrons has simultaneously high oxygen ion conductivity and electronic conductivity. In order to apply this substance to the above-mentioned fields, such properties are required as that high mixed electrical conductivity must be maintained in the range from high partial oxygen pressure such as air to extremely low partial oxygen pressure such as hydrogen gas or methane gas, and also chemically and mechanically stable in temperature range of 500-1000° C. where it is generally used.

The mixed conductor having mixed electrical conductivity arising from oxygen ions and electrons (the mixed conductor) has two types as shown below in wide classification.

(1) Single-Phase Mixed Conductor

This is the type that the substance itself has mixed conductivity, and as examples, Perovskite-type oxides in La—Sr—Co—Fe, and La—Sr—Ga—Fe systems are well known (See Ref.: Chem. Lett., 1985, 1743, Am. Ceram. Soc. Bull., 74, 1995, 71, Catal. Today, 36, 1997, 265, Solid State Ionics, 129, 2000, 285, Solid State Ionics, 135, 2000, 631.).

(2) Composite-Type Mixed Conductor

This is the type in which mixed conductivity is realized by making a composite from two substances one of which shows, as a single component, oxygen ion conductivity, and the other of which shows, as a single component, electronic conductivity, and for examples, the composite of an ionic conductor such as yttria-stabilized zirconia (YSZ) and an electronic conductor such as metal Pd, or the composite of gadolinium-doped cerium oxide and Perovskite-type oxides in La—Sr—Mn system are known.

In case of a single-phase mixed conductor, the substances are extremely limited to obtain high mixed conductivity, while for a composite-type mixed conductor wide varieties of substances are applicable. Also in case of composite-type mixed conductors, since several other species of substances are able to be included, it is possible to impart secondary functions, such as catalytic function.

However, composite-type mixed conductors have their own problems. For example, in YSZ-Pd composite, since one component is a ceramics while the other is a metal, it is difficult to obtain densified sintered product, and even if it is obtained, in case of the thermal expansion coefficients widely different in the two phases, cracking may be caused by thermal cycles or other like phenomena.

Further, it is necessary to form conductive networks of oxygen ion conductive phase and electronic conductive phase, respectively, in order to realize mixed conductivity, so that it is required to take into consideration the problem of percolation based on the volume ratio of the phases. Here, percolation is such a phenomenon that, for example, when metal powders are mixed into insulation matrix to obtain electrical conductivity, if the volume ratio of metal powders to insulation matrix exceeds a certain value (critical volume ratio), the network of metal powder is formed in the insulator, and the conductivity increases suddenly.

It is also pointed out for the composite of gadolinium-doped cerium oxide and Perovskite-type oxides in La—Sr—Mn system that, even when high mixed conductivity is attained, the two phases cause chemical reaction upon using at high temperature, and a different phase is formed to disturb mixed conductivity at interface (See Ref.: Solid State Ionics 146, 2002, 163, and J. Eur. Ceram. Soc. 21, 2001, 1763.).

In view of the above-mentioned problems, it is the first object of the present invention to provide a composite-type mixed oxygen ion and electronic conductor, in which oxygen ion conductive phase and electronic conductive phase are uniformly mixed, thereby cracking due to the difference of thermal expansion coefficient does not occur, oxygen ion conductive phase and electronic conductive phase respectively form conductive networks, and a different phase to disturb mixed conductivity is not formed by the reaction of both phases, consequently oxygen permeability is high, and aged deterioration does not easily occur. In addition, it is the second object to provide the method to manufacture said composite-type mixed oxygen ion and electronic conductor.

DISCLOSURE OF THE INVENTION

In order to attain the above-mentioned objects, a composite-type mixed oxygen ion and electronic conductor of the present invention is characterized in that it comprises gadolinium-doped cerium oxide (composition formula: $Ce_{1-x}Gd_xO_{2-x/2}$, where $0<x<0.5$) as oxygen ion conductive phase, and spinel-type ferrite (composition formula: $MFe_2O_4$, where M=Mn, Fe, Co, Ni) as electronic conductive phase.

Also, another composite-type mixed oxygen ion and electronic conductor of the present invention is characterized in that it comprises praseodymium-doped cerium oxide (composition formula: $Ce_{1-x}Pr_xO_{2-x/2}$ where $0<x<0.5$) as oxygen ion conductive phase, and spinel-type ferrite (composition formula: $MFe_2O_4$, where M=Mn, Fe, Co, Ni) as electronic conductive phase.

In the above composite-type mixed oxygen ion and electronic conductors of the present invention, oxygen ion conductive phase may contain a catalyst or catalysts to accelerate conversion of oxygen gas to oxygen ion, and oxygen ion to oxygen gas, or it is coated with catalysts on the surface of oxygen ion conductive phase to accelerate conversion of oxygen gas to oxygen ion, and oxygen ion to oxygen gas.

In the composite-type mixed oxygen ion and electronic conductor of the present invention, oxygen ion conductive phase and electronic conductive phase respectively may consist of fine particles having a diameter of 1 µm or less, the respective phases are mutually mixed uniformly, and form the respective conductive networks. Also preferably, the volume composition ratio of electronic conductive phase to oxygen ion conductive phase is 5 to 40%.

According to this makeup, the oxygen ion conductive phase and the electronic conductive phase have low mutual solid solubility, chemical reaction does not easily occur between the two phases, and even if chemical reactions occur between the two phases, different phases which disturb mixed conductivity are not formed. Also since the diameter of the particles is extremely fine and the particles are mixed uniformly, the oxygen ion conductive phase and the electronic conductive phase are not damaged by the difference in thermal expansion coefficient, and since the volume fraction ratio of the electronic conductive phase to the oxygen ion conductive phase is 5 to 40%, both phases respectively form conductive networks.

Also since the catalysts to accelerate conversion of oxygen to oxygen ion and oxygen ion to oxygen are contained, or coated on the surface, generation velocity of oxygen ion and oxygen is high.

Therefor, the composite-type mixed conductor can be provided, in which oxygen permeability is high and aged deterioration does not easily occur.

A method to manufacture the above mentioned composite-type mixed oxygen ion and electronic conductor of the present invention is characterized in that it comprises the steps of: polymerizing by mixing metal salts of the metals constituting gadolinium-doped cerium oxide, metal salts of the metals constituting spinel-type ferrite, a catalyst or catalysts to accelerate conversion of oxygen gas to oxygen ion and oxygen ion to oxygen, a chelate complex, and a chelate polymerization initiator; carbonizing thus polymerized mixed phase; dissociating carbons of thus carbonized mixed phase by oxidation to obtain oxides of the above-mentioned metals; grinding said metal oxides to powders; and sintering said powders after iso-static pressing.

Said catalysts may be coated after said sintering instead of said mixing. The metal salts of the metals constituting gadolinium-doped cerium oxide may be preferably $Ce(NO_3)_3 \cdot 6H_2O$ and $Gd(NO_3)_3 \cdot 5H_2O$, or $Ce(NO_3)_3 \cdot 6H_2O$ and $Gd(OH)_3$, and the metal salts of the metals constituting spinel-type ferrite may be any one or more salts selected from the group which consists of $Fe(NO_3)_3 \cdot 9H_2O$, $Co(NO_3)_2 \cdot 6H_2O$, $Ni(NO_3)_2 \cdot 6H_2O$, and $Mn(NO_3)_2 \cdot 6H_2O$, the catalyst may be Ru or Ni, or their combination, the chelate complex may be anhydrous citric acid, and the chelate polymerization initiator may be ethylene glycol.

According to this makeup, it is possible to manufacture a composite-type mixed oxygen ion and electronic conductor in which oxygen ion conductive phase consists of gadolinium-doped cerium oxide fine grains having diameter of 1 µm or less, electronic conductive phase consists of spinel-type ferrite particles having diameter of 1 µm or less, the catalysts to accelerate conversion of oxygen gas to oxygen ion and oxygen ion to oxygen are contained, and said phases are finely mixed to respectively form conductive networks.

Another method of manufacturing the composite-type mixed oxygen ion and electronic conductor of the present invention is characterized in that it comprises the steps of: polymerizing by mixing metal salts of the metals constituting praseodymium-doped cerium oxide, metal salts of the metals constituting spinel-type ferrite, catalysts to accelerate the conversion of oxygen gas to oxygen ion and oxygen ion to oxygen, a chelate complex, and a chelate polymerization initiator; carbonizing thus polymerized mixed phase; dissociating carbons of thus carbonized mixed phase by oxidation to obtain oxides of the above-mentioned metals; grinding said metal oxides to powders; and sintering said powders after iso-static pressing.

Said catalysts may be coated after said sintering in stead of said mixing. The metal salts of the metals constituting praseodymium-doped cerium oxide may be preferably $Ce(NO_3)_3 \cdot 6H_2O$ and $Pr(NO_3)_3 \cdot 5H_2O$, or $Ce(NO_3)_3 \cdot 6H_2O$ and $Pr(OH)_3$, and the metal salts of the metals constituting spinel-type ferrite may be any one or more salts selected from the group which consists of $Fe(NO_3)_3 \cdot 9H_2O$, $Co(NO_3)_2 \cdot 6H_2O$, $Ni(NO_3)_2 \cdot 6H_2O$, and $Mn(NO_3)_2 \cdot 6H_2O$, the catalyst may be Ru or Ni, or their combination, the chelate complex may be anhydrous citric acid, and the chelate polymerization initiator may be ethylene glycol.

According to this makeup, it is possible to manufacture the composite-type mixed oxygen ion and electronic conductor in which oxygen ion conductive phase consists of praseodymium-doped cerium oxide fine particles having a diameter of 1 µm or less, electronic conductive phase consists of spinel-type ferrite grains having a diameter of 1 µm or less, the catalysts to accelerate conversion of oxygen gas to oxygen ion and oxygen ion to oxygen are contained, and said phases are finely mixed to respectively form conductive networks.

Therefore, according to the present invention, it is possible to provide the composite-type mixed oxygen ion and electronic conductor in which oxygen permeability is high, and aged deterioration does not easily occur.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and an understanding thereof, in which drawings.

BEST MODES FOR CARRYING OUT THE INVENTION

Hereinafter, a detailed explanation is given in respect to embodiment of the present invention, references being made to figures.

First of all, explanation will be given to the method of manufacturing the composite-type mixed oxygen ion and electronic conductor of the present invention. The method is characterized in that it uses liquid phase mixing method, or Pechini Method in another word, or complex polymerization method in another word. The mixed state by this method is not merely a state mixed as a liquid phase, but also is an atomic level mixed state in which various metal elements are enclosed into polymer, and thereby it becomes possible to obtain the product of uniform composition even after the following sintering. Merely dissolving the salts of nitrate or chloride into water causes a mixed state mixed at an atomic level, but the respective salts precipitate as individual particles when water is evaporated. In the case of this liquid phase mixing method, since metal elements are enclosed inside the complex (polymer), the uniform mixed state can be maintained even after the transition from the liquid state to the solid state. The liquid phase mixing method is used in the present invention for the necessity that ionic conductor and electronic conductor are mixed uniformly and finely. On the other hand, because of mixing uniformness, it tends to happen in general that two phases mixed uniformly cause unexpected secondary reaction, but gadolinium-doped cerium oxide phase (composition formula: $Ce_{1-x}Gd_xO_{2-x/2}$) and spinel-type ferrite phase (composition formula: $MFe_2O_4$, where M=Mn, Fe, Co, or Ni), or praseodymium-doped cerium oxide phase (composition formula: $Ce_{1-x}Pr_xO_{2-x/2}$) and spinel-type ferrite phase of the present invention quite seldom cause such undesirable secondary reactions.

Next, detailed explanation will be given to a method of manufacturing a composite-type mixed conductor of the present invention taking a case of M=Co as an example. As the solution in the liquid phase mixing method, anhydrous citric acid (Aldrich Chemical Co. Ltd., purity 99.5%) as a chelate complex ligand, and ethylene glycol (Aldrich Chemical Co. Ltd., purity 99%) as a chelate polymerization initiator were used. And as the metal salts, $Ce(NO_3)_3 \cdot 6H_2O$ (Japan Pure Chemical Co. Ltd., purity 99.9%), $Gd(NO_3)_3 \cdot 5H_2O$ (Japan Pure Chemical Co. Ltd., purity 99.9%), $Fe(NO_3)_3 \cdot 9H_2O$ (Japan Pure Chemical Co. Ltd., purity 99.9%), and $Co(NO_3)_2 \cdot 6H_2O$ (Japan Pure Chemical Co. Ltd., purity 99.9%) were used.

Firstly, respective chemicals mentioned above were taken and weighed so to make pre-designed composition ratio, and mixed with a stirrer. Temperature was gradually raised to about 200° C. while stirring for about 4 to 5 hours to get polymerization. At the state of sufficiently high viscosity, it was completely carbonized at 400° C. in an electric furnace, that is, C—C or C—H bonds were cut off. After that, it was lightly crushed to become powder in an agate mortar, and fired again at 700° C. in an electric furnace to obtain oxide phase. Thus obtained powder was pelletized with oil-pressure hand-press to pellets of φ 20 mm×about 1 mm, and then pressed at 300 MPa with a hydrostatic press. The sintering was done with the conditions 1300° C., 2 hours, and in atmosphere. Samples were also made, which contains Ru or Ni as a catalyst, and was coated with Ni catalyst.

Although the above explanation was made for the method of manufacturing a composite-type mixed conductor of which the oxygen ion conductive phase is gadolinium-doped cerium oxide phase, the method of manufacturing a composite-type mixed conductor of which the oxygen ion conductive phase is praseodymium-doped cerium oxide phase is given by using Pr nitrate or the like salt in place of Gd nitrate mentioned above.

Next, explanation will be given to the structure of a composite-type mixed conductor of the present invention manufactured in accordance with the method above explained. Here, in order to give the following explanation brief, $(Ce_xGd_{1-x})O_{2-0.5x}$ is called as GDC, $CoFe_2O_4$ is called as CFO, and the volume fraction ratio (volume ratio) of CFO to GDC is expressed as x. Also, the sample containing spinel-type oxide (CFO) of x vol % is called as GDC-xCFO.

Figure 1:
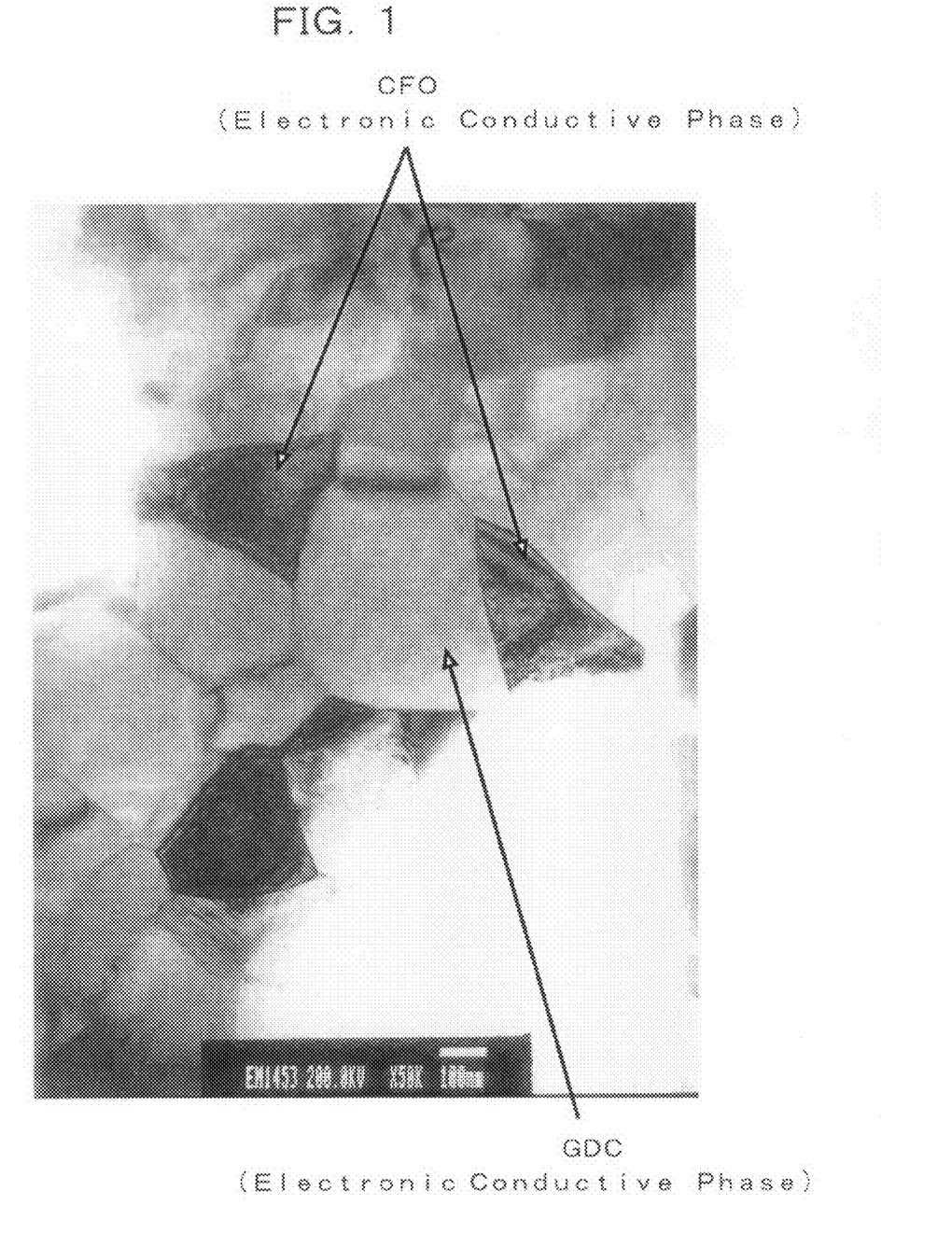
FIG. 1 is a view showing the image of the GDC-CFO composite-type mixed oxygen ion and electronic conductor of the present invention taken by transmission electron microscope.
Figure 2:
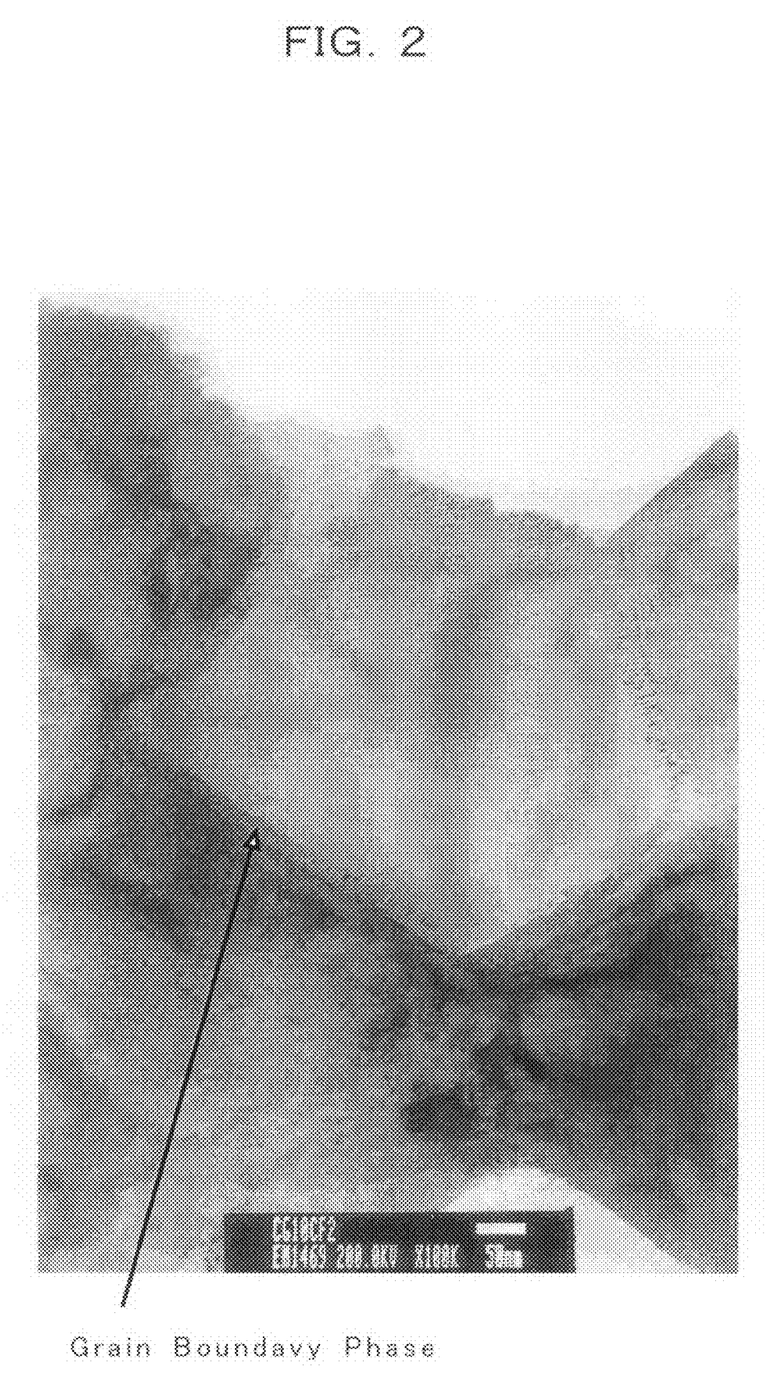
FIG. 2 is a view showing the image of the GDC-CFO composite-type mixed oxygen ion and electronic conductor of the present invention taken by transmission electron microscope (high magnification).

FIG. 1 and FIG. 2 are views showing the image of the GDC-17CFO sintered at 1300° C. taken by transmission electron microscope. The composition of GDC is $(Ce_{0.8}Gd_{0.2})O_{1.9}$.

In FIG. 1, the white part is GDC of oxygen ion conductive phase, and the black part is CFO of electronic conductive phase (confirmed by an apparatus for micro-region composition analysis). Both GDC and CFO are seen to be crystalline grains having diameter of 0.2-0.5 μm. And, as seen clearly in FIG. 2, grain boundary phase of about 50 nm width can be confirmed at boundary region of the particles. In general, such formation of grain boundary phase in composite-type mixed conductors may disturb its mixed conductivity, but this part of the present sample was confirmed to be a mixed state of ultra-fine grains of GDC and CFO, of which the size is about 10 nm.

Figure 3:
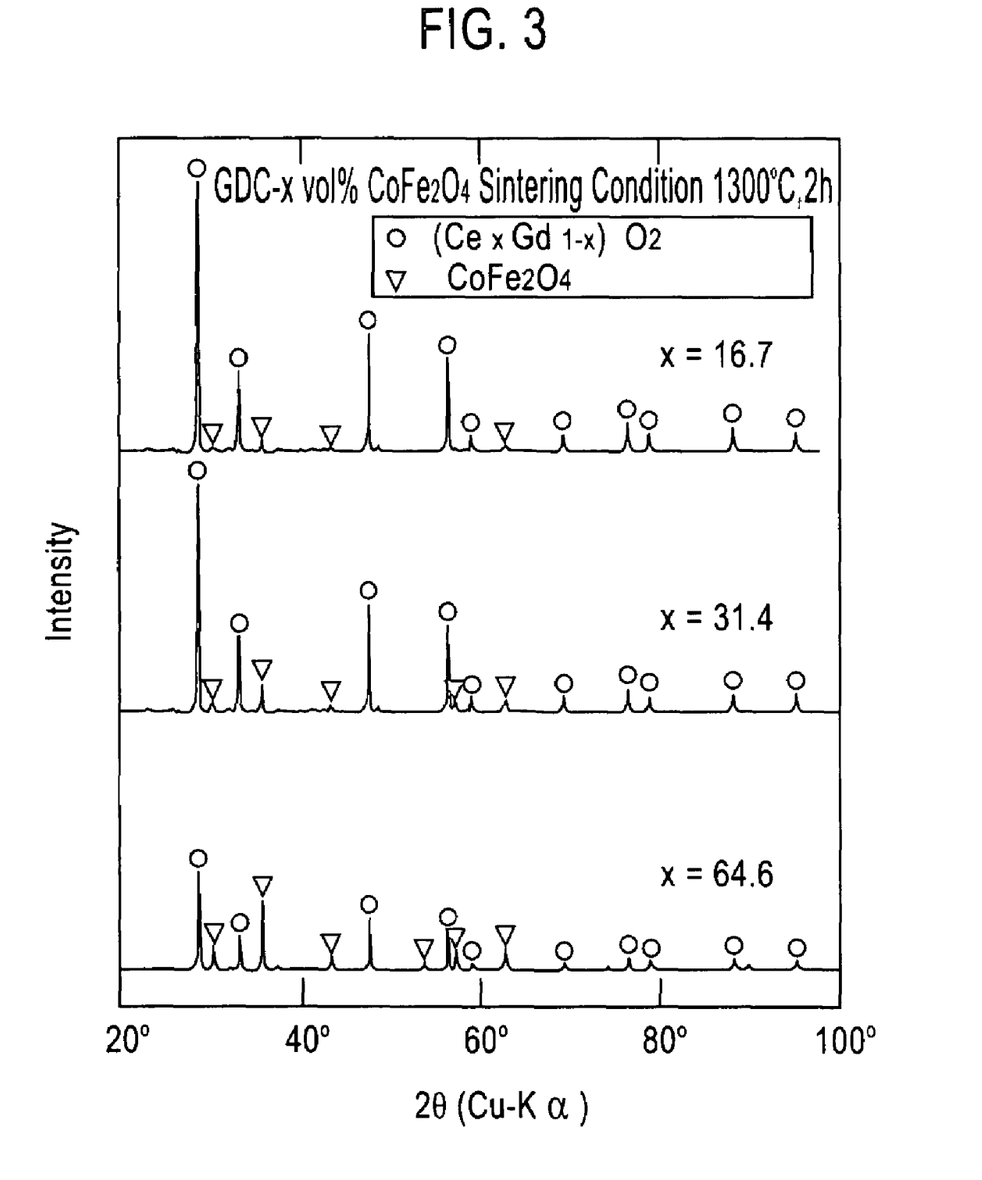
FIG. 3 is a view showing the pattern of powder X-ray diffraction of GDC-xCFO.

FIG. 3 is a view showing the pattern of powder X-ray diffraction of GDC-xCFO.

The patterns are of the three samples of x=16.7, 31.4, and 64.6 vol %. In the figure, ○ shows diffraction peaks assigned to $Ce_xGd_{1-x}O_2$ solid solution, and ▼ shows diffraction peaks assigned to $CoFe_2O_4$ (Fe spinel oxide). From the result of powder X-ray diffraction, it was confirmed that GDC was $Ce_xGd_{1-x}O_2$ solid solution, and CFO was $CoFe_2O_4$ (spinel ferrite oxide).

In addition, a weak diffraction peak of $GdFeO_3$ Perovskite-type oxide was observed after being used for the oxygen separation from air, or methane partial oxidation at 1000° C. for a long time, but during and after the time the capability of oxygen separation or methane partial oxidation was not changed, therefore it was confirmed that this oxide does not disturb the mixed conductivity.

Next, explanation will be given to the electrical property and oxygen permeability of a composite-type mixed conductor of the present invention manufactured in accordance with the method above explained.

The electrical property was measured by fixing the sample in a certain partial oxygen pressure atmosphere at a certain temperature, and by 4 point probe method by using electrodes pulling out from the sample. As for the electrical property of the sample, it was confirmed that p-type hole conduction is predominant in the range of oxygen partial pressure $1$-$10^{-6}$ atm, and n-type electron conduction is predominant in the range of oxygen partial pressure $10^{-6}$ atm or less.

Figure 4:
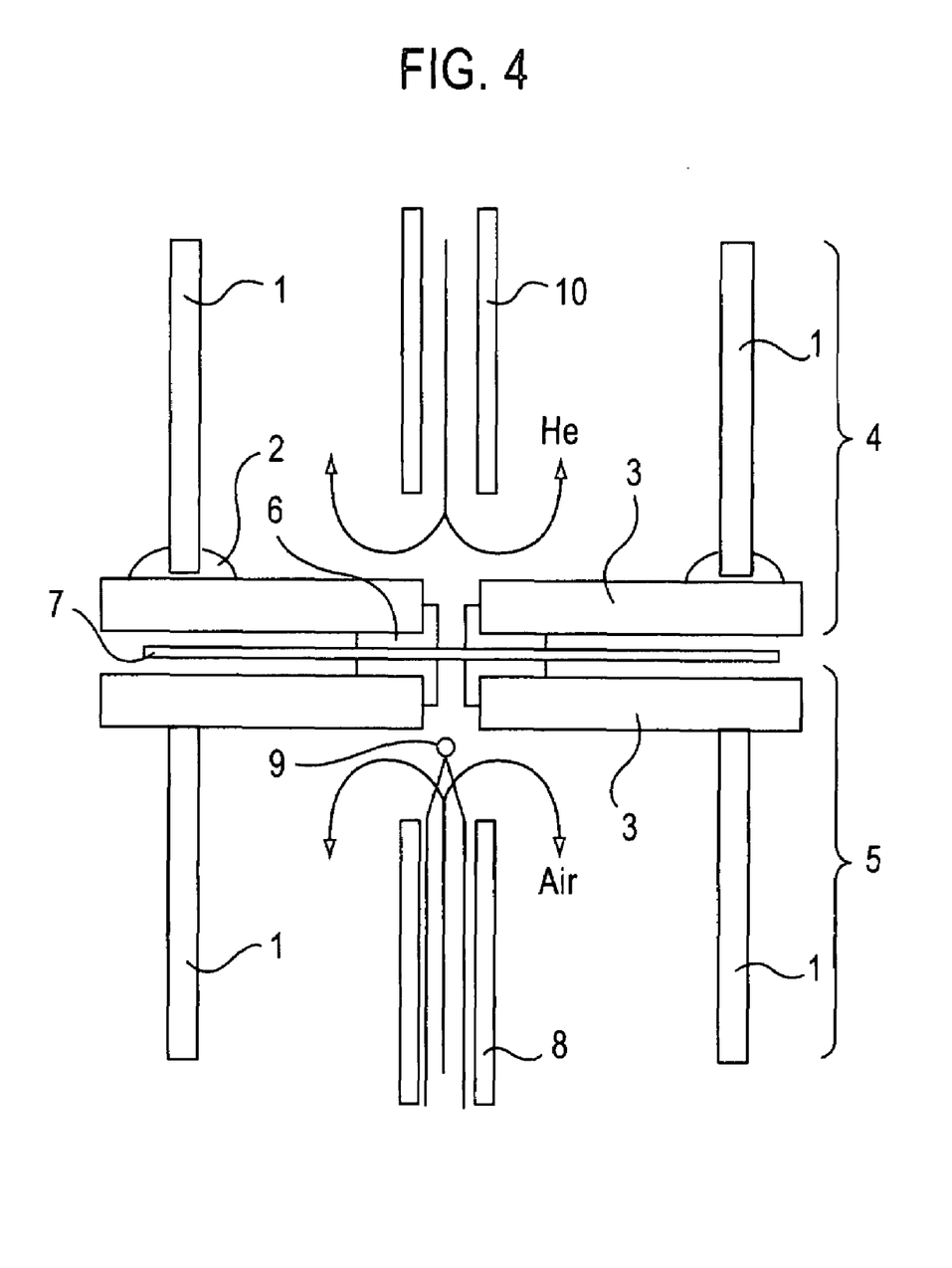
FIG. 4 is a view showing the measurement system used to measure oxygen permeability.

FIG. 4 is a view showing the measurement system used to measure oxygen permeability. The oxygen flux measurement section 4 in which a ceramic plate 3 having a hole was enclosed and fixed through a soda glass ring 2 to the bottom part of transparent quartz tube 1, and the atmospheric pressure impressing section 5 in which a ceramic plate 3 having a hole was fixed to the bottom part of transparent quartz tube 1 were prepared, and the sample 7 was fixed between both ceramic plates 3 through a gold ring 6. From the atmospheric pressure impressing section 5 side, hot air was fed in through an alumina tube 8. The outlet temperature of the alumina tube 8 was measured with a thermocouple 9 and defined as the sample temperature. He gas or a mixed gas of $H_2$ and Ar was introduced through an alumina tube 10. When He gas was introduced, the quantity of oxygen which permeated from the air side to be mixed into He gas flux was analyzed by a gas chromatography and a quadropole gas mass-spectrometer, and the number of permeated oxygen molecules per unit time per unit area, that is, oxygen flux density $jO_2$ was calculated. When a mixed gas of $H_2$ and Ar was introduced, since the permeated oxygen reacted with $H_2$ to produce water, oxygen flux density $jO_2$ was given as a half of $H_2$ decrease.

Figure 5:
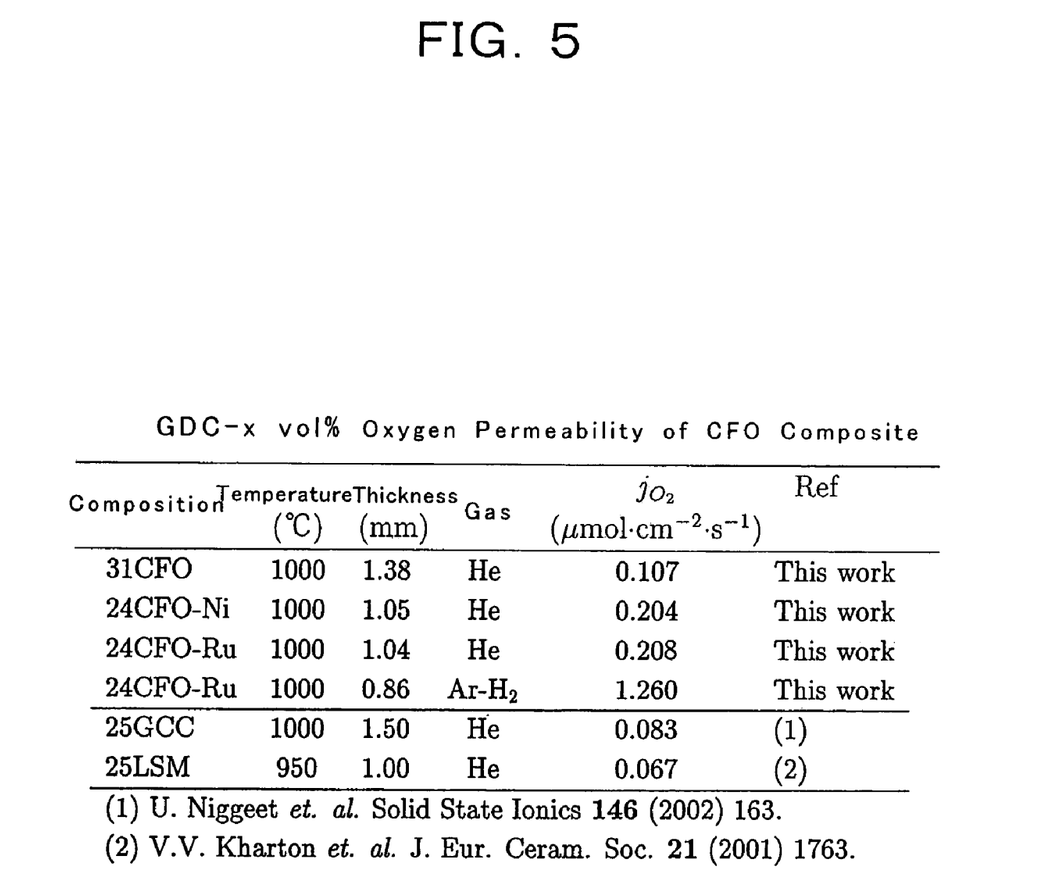
FIG. 5 is a table showing oxygen permeability of the composite-type mixed oxygen ion and electronic conductor of the present invention.

FIG. 5 is a table showing the comparison of oxygen permeability of the GDC—CFO composite-type mixed oxygen ion and electronic conductor of the present invention to the conventional composite-type mixed conductor. In the figure, the kinds of composite-type mixed conductors are shown by the volume composition ratio of CFO to GDC and the kinds of doped catalysts, and the measurement temperature was 1000° C. In the lower part of the table, the oxygen permeability of the conventional composite-type mixed conductor was shown.

As is obvious from the figure, the oxygen permeability of the GDC—CFO composite-type mixed oxygen ion and electronic conductor of the present invention is shown to be equal or more than that of the conventional types. Further, that containing Ni and Ru as catalysts, and coated with Ni catalyst on the surface (24CFO—Ni and 24CFO—Ru) showed still higher oxygen permeability. It is also to be noted in addition to this that, in case of 24CFO—Ru sample with Ar—$H_2$ as carrier gas, oxygen flux density was $1.26 \mu mol \cdot cm^{-2} \cdot s^{-1}$ which is comparable to that of a single-phase mixed conductor. This 24CFO—Ru sample was stable chemically and mechanically during oxygen permeation experiment in Ar—$H_2$. From the above-mentioned facts, it turned out that GDC—CFO composite-type of the present invention is a novel high quality oxygen permeation membrane of mixed oxygen ion and electronic conductor type.

Here in FIG. 5, 25GCC used for comparison is the composite-type mixed conductor in which the electronic conductive phase GCC expressed by the composition formula $(Gd_{1-x}Ca_x)CoO_3$ was mixed by 25% by volume ratio into oxygen ion conductive phase GDC. Also 25LSM is the composite-type mixed conductor in which the electronic conductive phase LSM expressed by the composition formula $(La_{1-x}Sr_x)MnO_3$ was mixed by 25% by volume ratio into oxygen ion conductive phase GDC.

Figure 6:
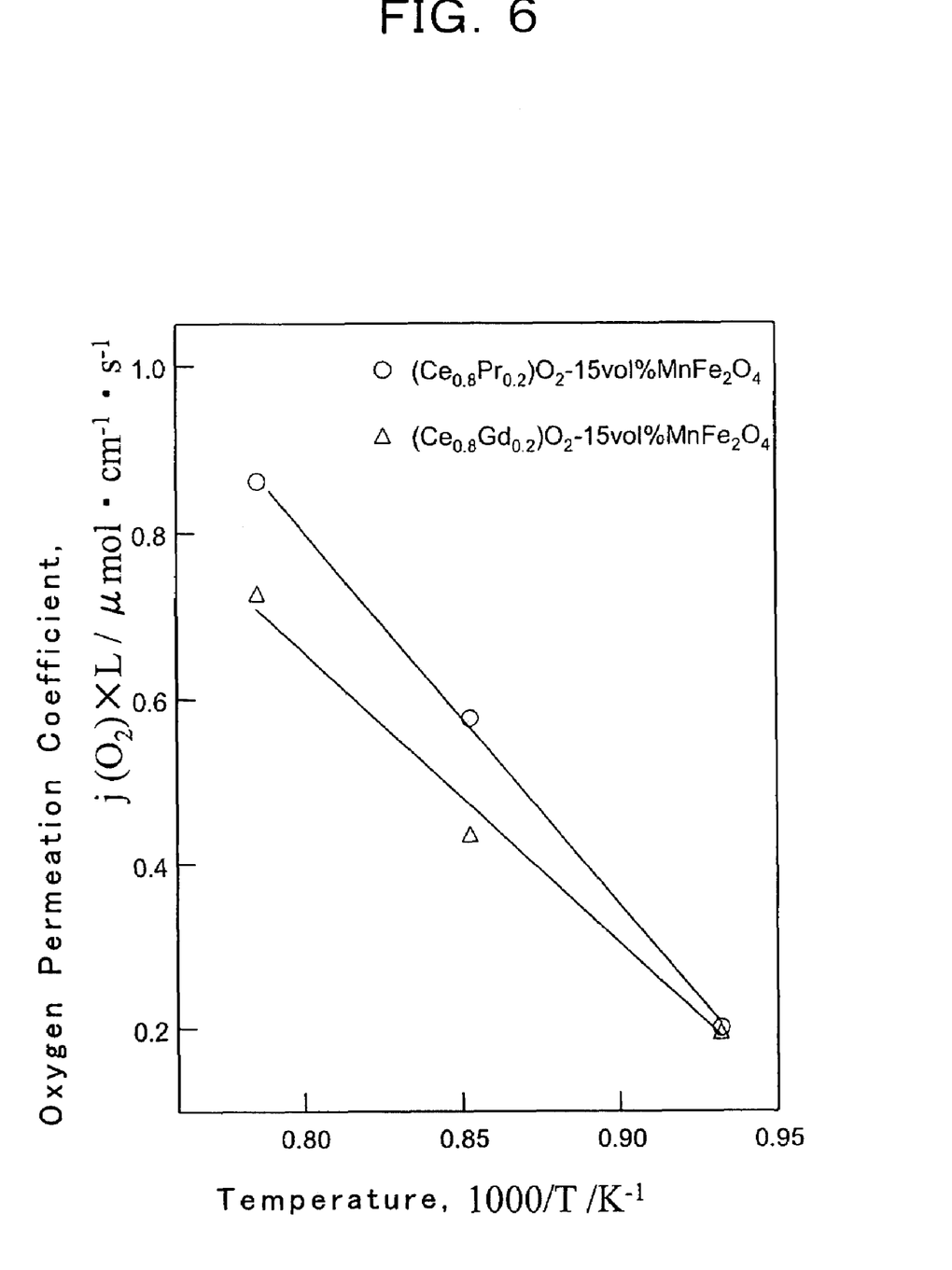
FIG. 6 is a graph showing oxygen permeation coefficient of the composite-type mixed oxygen ion and electronic conductor of the present invention.

FIG. 6 is a graph showing oxygen permeation coefficient of the composite-type mixed oxygen ion and electronic conductor of the present invention. The oxygen permeation coefficient used here is the value obtained by multiplying the oxygen permeation flux density with the sample thickness L, and one of the index of permeability not dependent on the film thickness. The measured samples were $(Ce_{0.8}Gd_{0.2})O_2$—15 vol % $MnFe_2O_4$ and $(Ce_{0.8}Pr_{0.2})O_2$—15 vol % $MnFe_2O_4$. In the figure, the ordinate shows the oxygen permeation coefficient, and the abscissa shows the temperature. Δ shows the oxygen permeation coefficient of $(Ce_{0.8}Gd_{0.2})O_2$—15 vol % $MnFe_2O_4$, and ○ shows the oxygen permeation coefficient of $(Ce_{0.8}Pr_{0.2})O_2$—15 vol % M.

From the figure, it can be seen that the composite-type mixed conductor with praseodymium-doped cerium oxide as an ionic conductive phase has higher oxygen permeation coefficient than that with gadolinium-doped cerium oxide as an ionic conductive phase. Here, since the price is lower for Pr than Gd, the composite-type mixed conductor with praseodymium-doped cerium oxide as an ionic conductive phase is quite useful in industry use.

Next, explanation will be given concerning to the volume composition ratio of an electronic conductive phase to an oxygen ion conductive phase.

Figure 7:
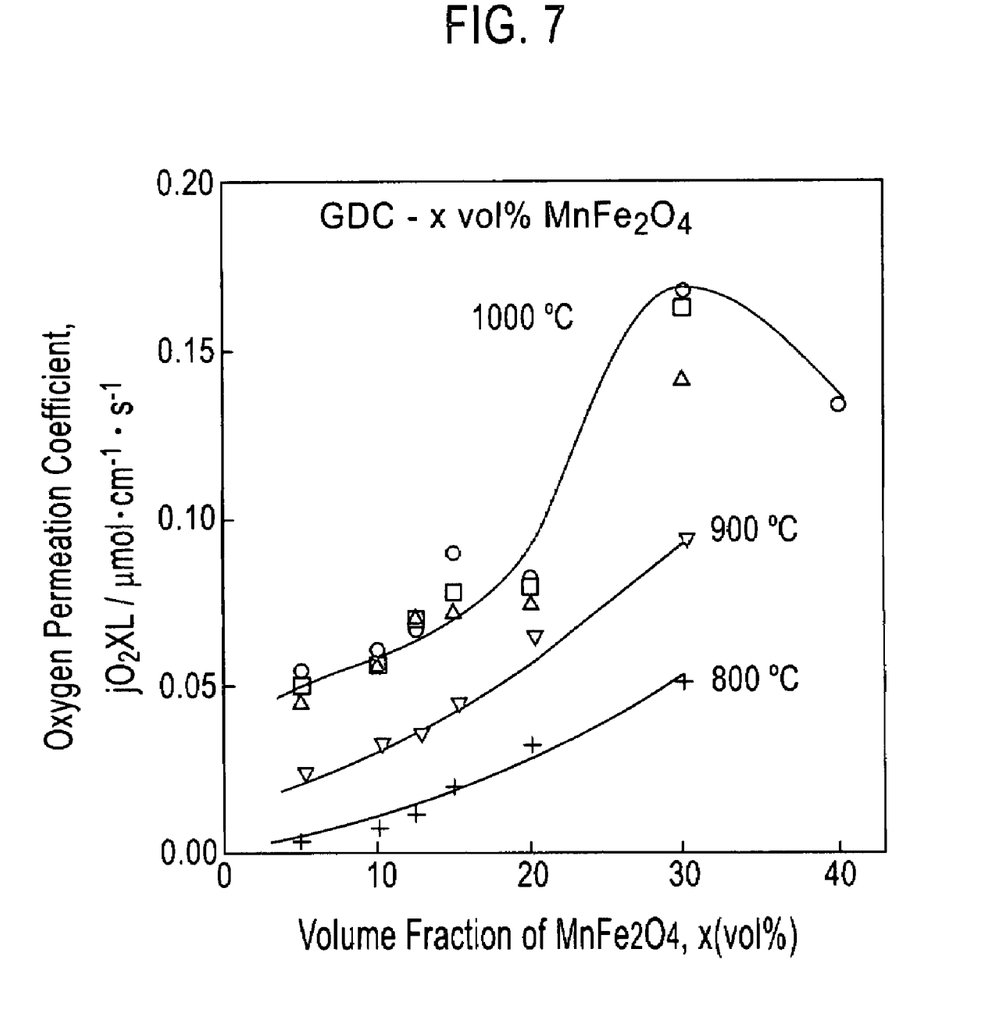
FIG. 7 is a graph showing the dependency of oxygen permeation coefficient upon ratio of electronic conductive phase volume to oxygen ion conductive phase volume of the composite-type mixed oxygen ion and electronic conductor of the present invention.

FIG. 7 is a graph showing the dependency of the oxygen permeation coefficient upon the volume ratio of the electronic conductive phase to the ionic conductive phase of the composite-type mixed oxygen ion and electronic conductor of the present invention. The samples used for measurement had GDC as an oxygen ion conductive phase, and $MnFe_2O_4$ as an electronic conductive phase. The abscissa shows the volume ratio x of $MnFe_2O_4$ phase to GDC phase, and the ordinate shows oxygen permeation coefficient. The measurement temperatures were 800° C., 900° C., and 1000° C.

As is seen from the figure, the oxygen permeation coefficient being usable is attained from x=5%, and it rapidly decreases with x=40% or more as seen in the graph of 1000° C. Consequently, the preferable volume composition ratio of the electronic conductive phase to the oxygen ion conductive phase is in the range of 5%-40%.

Next, an embodiment will be shown for the application of the composite-type mixed conductor of the present invention to the partial oxidative reforming of methane. First of all, explanation is given to the usefulness of the partial oxidative reforming of methane by the composite-type mixed conductor. Steam reforming is known as conventional arts as a method of manufacturing hydrogen from methane. The reaction scheme is given as follows.

$$CH_4 + H_2O \rightarrow CO + 3H_2 \quad \Delta H_{298} = 206.1 \text{ kJ/mol} \quad (1)$$

$$CO + H_2O \rightarrow CO_2 + H_2 \quad \Delta H_{298} = -41.6 \text{ kJ/mol} \quad (2)$$

By this steam reforming, 4 moles of hydrogen can be manufactured from 1 mole of methane by utilizing the shift reaction expressed as equation (2), and the residential use proton-exchange-membrane-type fuel cell now under development uses this system. However, since this steam reforming system is a large endothermic reaction of about 200 kJ/mol, the quick-starting ability is poor, and large amount of heat supply is required to maintain the reaction. On the other hand, since the partial oxidation method shown in equation (3) is exothermic reaction, it is the methane reforming method now drawing attention from the viewpoint of energy minimum and quick starting ability.

$$CH_4 + \tfrac{1}{2}O_2 \rightarrow CO + 2H_2 \quad \Delta H_{298} = -35.7 \text{ kJ/mol} \quad (3)$$

By this reaction, 3 moles of hydrogen can be manufactured from 1 mole of methane by utilizing the shift reaction likely in the steam reforming. Since this reaction is an exothermic reaction of about 36 kJ/mol, this reaction is a preferred reforming method from the viewpoint of energy efficiency and quick-starting ability. However, the reason for the fact that this method has so far not drawn attention compared with the steam reformation is that; 1) if air is used as the oxidizer, the formed hydrogen is mixed with nitrogen and thereby its concentration becomes low; 2) if pure oxygen is used as the oxidizer, then the problem mentioned in 1) can be solved, but the cost to produce pure oxygen by cryogenic separation system or else is quite high; 3) since methane and the oxidizer are simultaneously supplied, there exists necessity of the hard control, or there are problems from the viewpoint of safety. The method to overcome these drawbacks of the conventional partial oxidation method is the partial oxidation of methane method using an oxygen permeable membrane.

Figure 8:
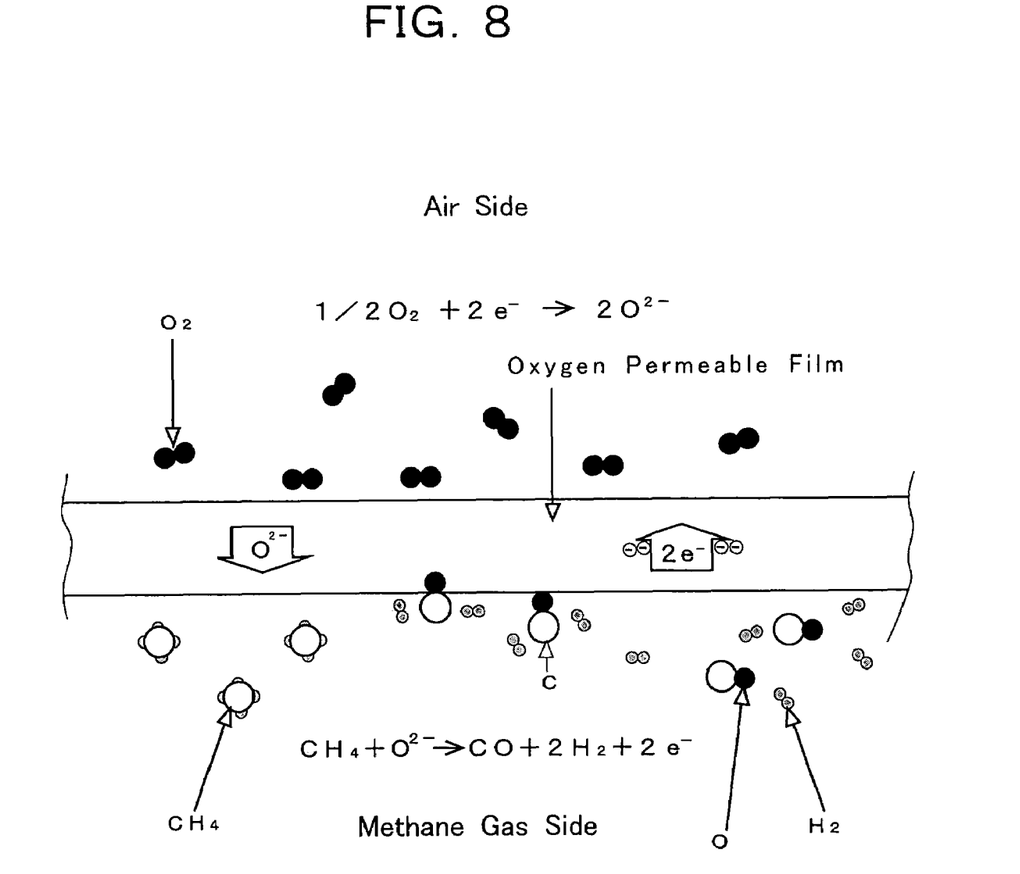
FIG. 8 is a view showing the outline of partial oxidation of methane by using the composite-type mixed oxygen ion and electronic conductor of the present invention.

The outline of this method is shown in FIG. 8. In this system, by supplying air and methane to both sides of the oxygen permeable ceramics (a mixed oxygen ion and electronic conductor only conducting oxygen ion and electron; an oxygen ion-electron mixed conductor), pure oxygen permeates to the methane side, and partial oxidation reaction takes place on the methane side. As its merits, 1) exothermic reaction, and in addition, 2) the system is simple, because the oxygen permeable ceramics does not need electrodes or interconnectors; 3) the required quantity of pure oxygen for reforming is automatically separated and supplied to the methane side; and 4) the oxygen permeable ceramic membrane acts as a separator for methane and air; can be mentioned.

In this embodiment, the composite-type mixed conductor of the present invention was used as this oxygen permeation membrane. Methane partial oxidation was conducted by supplying Ar-10% $CH_4$ gas. The composite-type mixed conductor of the present invention used here was GDC-15$MnFe_2O_4$.

Figure 9:
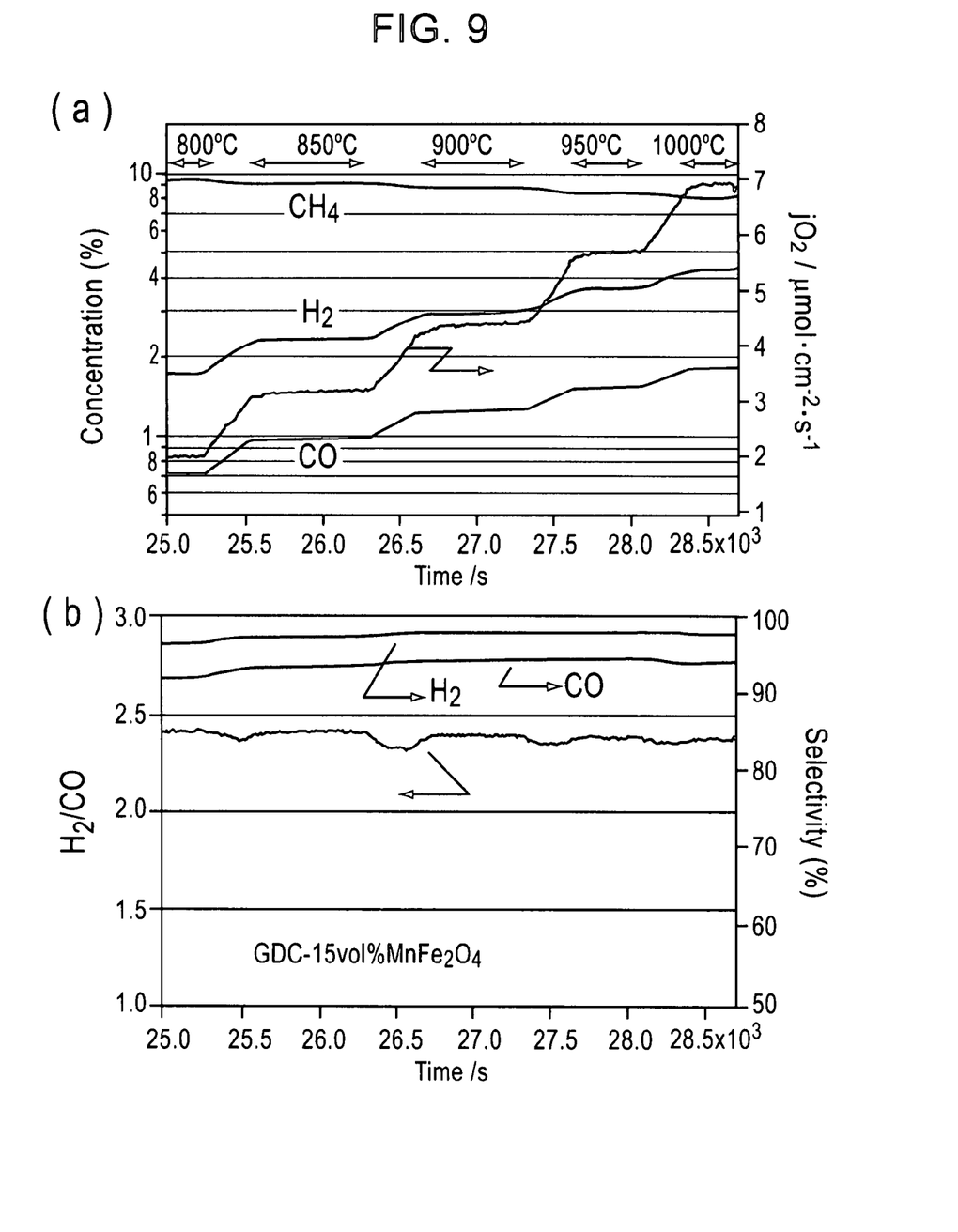
FIG. 9 is a graph showing the characteristics of partial oxidation of methane by the composite-type mixed oxygen ion and electronic conductor of the present invention.

FIG. 9 is a graph showing the characteristics of partial oxidation of methane by the composite-type mixed oxygen ion and electronic conductor of the present invention, and (a) is a graph showing the concentration changes of $CH_4$, $H_2$, and CO during the partial oxidation of methane, and its abscissa shows the methane partial oxidation time, the left-side ordinate shows the concentrations of $CH_4$, $H_2$, and CO, whereas the right-side ordinate shows the oxygen permeation flux density $jO_2$. Here, the partial oxidation of methane was conducted, as shown in the figure, by step-wise increase of temperature from 800° C. to 1000° C.

FIG. 9(b) is a graph showing the $H_2$/CO concentration ratio and $H_2$, CO selectivity during the above-mentioned methane partial oxidation. The left-side ordinate shows the $H_2$/CO concentration ratio, and the right-side ordinate shows the selectivity.

It is clear from FIG. 9(a) that GDC-15$MnFe_2O_4$ composite-type mixed oxygen ion and electronic conductor of the present invention has high oxygen permeation flux density of 7 $\mu mol \cdot cm^{-2} \cdot s^{-1}$ at 1000° C. which is comparable to that of La—Sr—Ga—Fe perovskite-type oxide which has the highest oxygen permeation flux density among the conventional materials, and also shows excellent property of 2 $\mu mol \cdot cm^{-2} \cdot s^{-1}$ even at 800° C. This oxygen permeation flux density at 1000° C. corresponds to the electric current density as high as 2.7 A/$cm^2$. Also from $H_2$/CO ratio and the selectivities of $H_2$ and CO both exceeding 90% in FIG. 9(b), it can be seen that the partial oxidation reaction of methane of equation (3) above shown mainly takes place. Also, from the fact that $H_2$/CO ratio is 2.3-2.4 which is higher than the theoretical value 2, it may be assumed that the shift reaction of equation (2) above shown takes place in addition to the partial oxidation reaction of equation (3).

In addition, as is also clear from the above mentioned figure, the operation of the embodiment was continued for about an hour at 800-1000° C., but no deterioration of property was observed during and after the operation, and neither phase decomposition nor crack took place. From these facts, it is seen that the composite-type mixed oxygen ion and electronic conductor of the present invention is the composite-type mixed oxygen ion and electronic conductor which has sufficient stability chemically and thermally, and causes no deterioration.

Explanation is given up to here for the exemplary embodiments of the present invention, but further various modification, abbreviation, and addition are possible in embodiments without departure from the principle and range of the present invention. Therefore, the present invention is not limited to the above-described embodiments, but must be understood to include the range and equivalent range defined by the factors mentioned in the claims.

INDUSTRIAL APPLICABILITY

As will have been appreciated from the foregoing description, the composite-type mixed oxygen ion and electronic conductor of the present invention has high oxygen permeability, and does not easily cause the aged deterioration. Therefore, it is applicable to an electrode material for solid electrolyte-type fuel cell in addition to hydrogen production by methane reforming. Also with oxygen partial pressure gradient generated by pressurizing the air side, oxygen separation from the air is made possible, thereby it is applicable to the generator of pure oxygen and oxygen-enriched gas.

What is claimed is:

1. A composite-type mixed oxygen ion and electronic conductor, characterized in that its oxygen ion conductive phase consists of praseodymium-doped cerium oxide (composition formula: $Ce_{1-x}Pr_xO_{2-x/2}$, where 0<x<0.5) and its electronic conductive phase consists of spinel-type ferrite (composition formula: $MFe_2O_4$, where M=Mn, Fe, Co, or Ni).

2. A composite-type mixed oxygen ion and electronic conductor as set forth in claim 1, characterized in that said oxygen ion conductive phase contains a catalyst or catalysts to accelerate conversion of oxygen gas to oxygen ion or oxygen ion to oxygen, or is coated with said catalysts, or contains said catalysts and coated with said catalysts on the surface.

3. A composite-type mixed oxygen ion and electronic conductor as set forth in claim 1, characterized in that said oxygen ion conductive phase contains a catalyst or catalysts to accelerate conversion of oxygen gas to oxygen ion or oxygen ion to oxygen, or is coated with said catalysts, or contains said catalysts and coated with said catalysts on the surface.

4. A composite-type mixed oxygen ion and electronic conductor as set forth in claim 3, characterized in that said catalyst is Ru or Ni, or their combination.

5. A composite-type mixed oxygen ion and electronic conductor as set forth in claim 1, characterized in that volume composition ratio of said electronic conductive phase to oxygen ion conductive phase is in the range of 5 to 40%.

6. A method of manufacturing a composite-type mixed oxygen ion and electronic conductor, characterized in that it comprises the steps of:

polymerizing by mixing metal salts of metals constituting praseodymium-doped cerium oxide, metal salts of metals constituting spinel-type ferrite, a catalyst or catalysts to accelerate conversion of oxygen gas to oxygen ion and oxygen ion to oxygen, a chelate complex, and a chelate polymerization initiator;

carbonizing said polymerized mixed phase;

dissociating carbons of said carbonized mixed phase by oxidation to obtain oxides of said metals;

grinding said metal oxides to powders; and sintering said powders after isostatic pressing.

7. A method of manufacturing a composite-type mixed oxygen ion and electronic conductor as set forth in claim 6, characterized in that said metal salts constituting praseodymium-doped cerium oxide are $Ce(NO_3)_3.6H_2O$ and $Pr(NO_3)_3.6H_2O$, or $Ce(NO_3)_3.6H_2O$ and $Pr(OH)_3.6H_2O$, and said metal salts constituting spinel-type ferrite is one or more salts selected from the group which consists of $Fe(NO_3)_3.9H_2O$, $Co(NO_3)_2.6H_2O$, $Ni(NO_3)_2.6H_2O$, and $Mn(NO_3)_2.6H_2O$, and said catalyst or catalysts is one or more elements selected from the group which consists of Ru and Ni, and said chelate complex is anhydrous citric acid, and said chelate polymerization initiator is ethylene glycol.

8. A method of manufacturing a composite-type mixed oxygen ion and electronic conductor, characterized in that it comprises the steps of:

polymerizing by mixing metal salts of metals constituting praseodymium-doped cerium oxide, metal salts of metals constituting spinel-type ferrite, a chelate complex, and a chelate polymerization initiator;

carbonizing said polymerized mixed phase;

dissociating carbons of said carbonized mixed phase by oxidation to obtain oxides of said metals;

grinding said metal oxides to powders; and sintering said powders after isostatic pressing.

9. A method of manufacturing a composite-type mixed oxygen ion and electronic conductor as set forth in claim 8, characterized in that said metal salts constituting praseodymium-doped cerium oxide are $Ce(NO_3)_3.6H_2O$ and $Pr(NO_3)_3.6H_2O$, or $Ce(NO_3)_3.6H_2O$ and $Pr(OH)_3.6H_2O$, and said metal salts constituting spinel-type ferrite is one or more salts selected from the group which consists of $Fe(NO_3)_3.9H_2O$, $Co(NO_3)_2.6H_2O$, $Ni(NO_3)_2.6H_2O$, and $Mn(NO_3)_2.6H_2O$, and said catalyst or catalysts is one or more elements selected from the group which consists of Ru and Ni, and said chelate complex is anhydrous citric acid, and said chelate polymerization initiator is ethylene glycol.

* * * * *